March 14, 1961 G. GELOSO 2,974,892

REEL FOR MAGNETOPHONE BANDS

Filed Feb. 4, 1957

INVENTOR.
Giovanni Geloso
BY
Michael S. Striker
Attorney

United States Patent Office

2,974,892

Patented Mar. 14, 1961

2,974,892

REEL FOR MAGNETOPHONE BANDS

Giovanni Geloso, Viale Brenta 29, Milan, Italy

Filed Feb. 4, 1957, Ser. No. 637,925

Claims priority, application Italy Apr. 20, 1956

4 Claims. (Cl. 242—71.8)

The present invention relates to a magnetophone reel.

One object of the invention is to provide a reel which can be made in two parts, of which each part comprises a discoidal element provided with a tubular hub at one of the bases of the discoidal element, the said two parts being interconnected by slipping one over the other of the two tubular hubs, the outer diameter of one of which corresponding to the inner diameter of the other.

Another important feature is to provide at least one square or panel on the reel upon which annotations can be written and to provide a scale on which the length of the band wound on the reel may be observed. The invention will be described with reference to the schematic appended drawing, description and drawing being given only by way of indicative example, not limitative of the scope of the invention.

Figure 1:
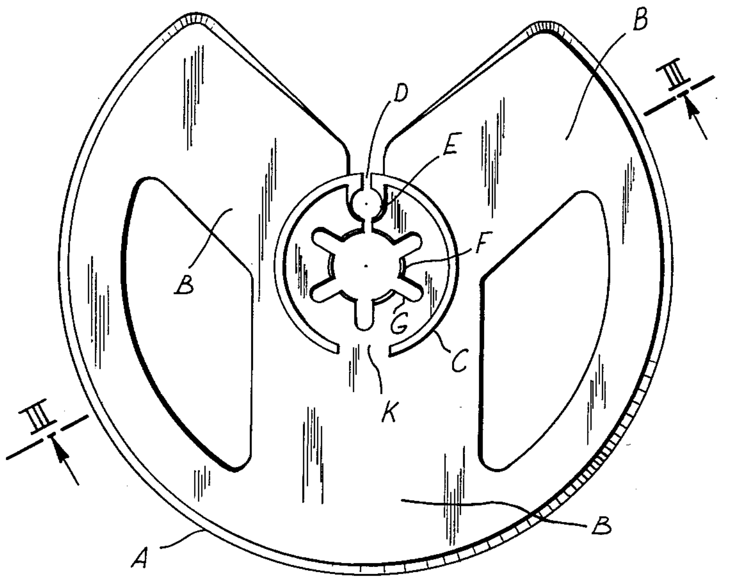
Fig. 1 is a plan view of the reel element.
Figure 3:
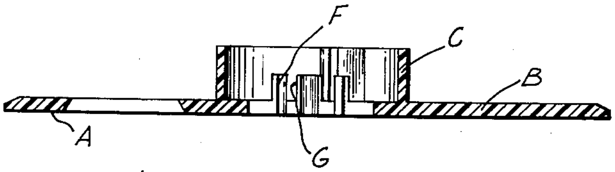
Fig. 3 is an axial section along the line III—III of Fig. 1.
Figure 2:
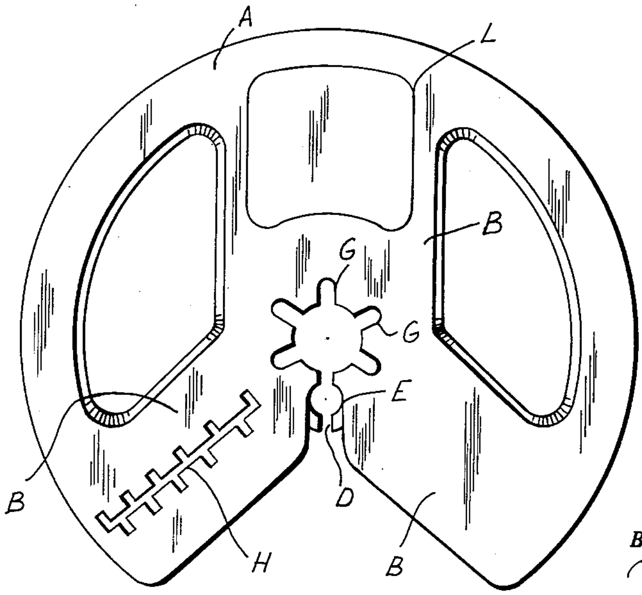
Fig. 2 represents the same element in a plan view, seen from the side opposite Fig. 1.

Referring to the figures, by A is indicated the discoidal element, constituted by a peripheral crown provided with radial arms B, and an axial tubular hub C projecting centrally from one side of the discoidal element.

The latter is formed with a V-shaped cutout between two contiguous arms so as to permit an easy insertion of the band end through a longitudinal slit D of the hub opening into a cylindrical opening E defined by two projections extending from the hub C radially inwardly and respectively from opposite sides of the slit D.

The discoidal element has also a tubular element F internal to, and co-axial with, the hub C (for accomodating the support pin, not shown of the reel) and having an axial length equal to one-half of the winding hub C, and provided with radial apertures G extending also into the discoidal element to accommodate the keys or key (not shown) for keying the reel to the supporting pin. The hub C is interrupted to form a gap K at the portion diametrally opposite the slit D. The gap K is adapted to receive the other reel part (not indicated) which is substantially identical with the described one, but has an inner hub diameter equal to the outer diameter of the illustrated hub C, so as to permit the connection of the two parts by slipping the one hub over the other with the two V-shaped cutouts of the discoidal elements arranged diametrically opposite each other. A rigid connection of the two elements can be obtained by fusing, welding, cementing or the like according to the material of which the two parts are made (for instance, thermo setting plastic material, thermo plastic material or the like).

The perimetral borders of the two facing discoidal elements are preferably chamfered for facilitating winding and unwinding of the magnetic band.

Each external surface of the discoidal element carries, on one of the arms a graduated scale opening H permitting observation of the position of the wound length of the band and upon another arm a square or panel L or the like for notations (for instance, with reference to the length of wound up band).

The square is preferably made by a process known under the name of "screening," which permits cancelling of the annotations.

I claim:

1. A reel construction formed from plastic material, comprising, in combination, a pair of substantially identical reel members each having a disc-shaped portion and a hollow hub portion projecting centrally from one face of said disc-shaped portion, the inner diameter of said hub portion of one of said members being substantially equal to the outer diameter of said hub portion of the other of said members, each of said hub portions being formed with a radial slit and a gap located diametrically opposite the slit, each of said hub portions having two radially inwardly extending projections, one on each side of the slit and forming between themselves an opening which is a radial extension of the slit, the gap formed in the hub portion of one reel member receiving the two inwardly extending projections of the other reel member so as to align said reel members with each other, each of said disc-shaped portions being formed with a substantially V-shaped cutout extending from the periphery of said disc toward said slit, said V-shaped cutout being symmetrically arranged with respect to said slit and communicating therewith, said hub portions being telescopically located one within the other, and said hub portions being fixed in telescoped condition to one another, whereby said slit of each of said hub portions is aligned with said gap of the other of said hub portions and said cutouts in said disc-shaped portions are diametrically opposed.

2. A reel construction as claimed in claim 1 in which the opening formed between said projections has in part a substantially circular section and a communicating radially inwardly extending section.

3. A reel construction as claimed in claim 1, in which the periphery of each of said disc shaped portions is chamfered.

4. A reel construction as claimed in claim 1, in which each V-shaped cutout subtends a substantial section of the periphery of said disc-shaped portion.

References Cited in the file of this patent

UNITED STATES PATENTS

| | | |
|---|---|---|
| 2,366,147 | May | Dec. 26, 1944 |
| 2,468,767 | Lloyd | May 3, 1949 |
| 2,766,947 | Hultgren | Oct. 16, 1956 |

FOREIGN PATENTS

| | | |
|---|---|---|
| 714,053 | Germany | Nov. 20, 1941 |
| 960,577 | France | Apr. 20, 1950 |